(12) United States Patent
Koreeda et al.

(10) Patent No.: US 8,770,859 B2
(45) Date of Patent: Jul. 8, 2014

(54) OPTICAL ADAPTER

(75) Inventors: Yuichi Koreeda, Tokyo (JP); Yasutaka Hiroki, Tokyo (JP); Naoki Katagiyama, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 185 days.

(21) Appl. No.: 13/054,836

(22) PCT Filed: Apr. 1, 2009

(86) PCT No.: PCT/JP2009/056808
§ 371 (c)(1),
(2), (4) Date: Jan. 19, 2011

(87) PCT Pub. No.: WO2010/010740
PCT Pub. Date: Jan. 28, 2010

(65) Prior Publication Data
US 2011/0123156 A1    May 26, 2011

(30) Foreign Application Priority Data

Jul. 22, 2008  (JP) .................................. 2008-188833

(51) Int. Cl.
*G02B 6/38* (2006.01)
(52) U.S. Cl.
CPC .................................. *G02B 6/3825* (2013.01)
USPC .................. 385/75; 385/53; 385/55; 385/56; 385/58; 385/60; 385/66; 385/68; 385/70; 385/72; 385/73
(58) Field of Classification Search
CPC .................................................... G02B 6/3825

USPC ................................................. 385/72, 73, 75
See application file for complete search history.

(56) References Cited

U.S. PATENT DOCUMENTS

| 6,431,762 B1 * | 8/2002 | Taira et al. ...................... 385/56 |
| 2006/0083467 A1 * | 4/2006 | Kramer et al. .................. 385/60 |

FOREIGN PATENT DOCUMENTS

| JP | 2001-33658 A | 2/2001 |
| JP | 2006-184367 A | 7/2006 |
| JP | 2008-26778 A | 2/2008 |

OTHER PUBLICATIONS

International Search Report dated May 19, 2009 in counterpart International Application No. PCT/JP2009/056808.

* cited by examiner

*Primary Examiner* — Ryan Lepisto
(74) *Attorney, Agent, or Firm* — Holtz Holtz Goodman & Chick PC

(57) ABSTRACT

The optical adapter includes a first housing 3, a second housing 5, and a sleeve 7. The first housing 3 includes a connector holding part 31, a first holder portion 33, an alignment part 35, and coupling portions 36. The first holder portion 33 is integrally formed with the connector holding part 31. The alignment part 35 includes an alignment part main body 351, a second holder portion 352 integrally formed with the alignment part main body 351, and a plurality of guide portions 352, 354, and 355, integrally formed with the alignment part main body 351. Protrusion-shaped coupling portions 36 for coupling the connector holding part 31 and the alignment part 35 are integrally formed with one of the connector holding part 31 and the alignment part main body 35.

6 Claims, 5 Drawing Sheets

OPTICAL ADAPTER

This application is a U.S. National Phase Application under 35 USC 371 of International Application PCT/JP2009/056808 filed Apr. 2, 2009.

TECHNICAL FIELD

The present invention relates to an optical adapter that connects optical connectors to each other.

BACKGROUND ART

Conventionally, there has been proposed an optical adapter comprising a first housing, a second housing, and a sleeve holder assembly (see Patent Literature 1).

The first housing is substantially hollow prism-shaped, and includes a pair of guides. The pair of guides are each long plate-shaped, and extend parallel to each other in the same direction.

The second housing is substantially rectangular parallelepiped-shaped. The second housing has a central portion formed with a hole for accommodating a split sleeve, one holder of the sleeve holder assembly, and a ferrule of one optical connector. Further, the second housing has opposite side surfaces formed with a pair of guide grooves for guiding the pair of guides of the first housing.

The sleeve holder assembly comprises a pair of sleeve holders and the split sleeve.

The pair of sleeve holders each have the same shape, but are assembled to each other such that one is inverted from the other. Each sleeve holder has a holder and a supporter. The holder holds the split sleeve. The supporter has a substantially rectangular shape, and is integrally formed with the holder.

To assemble this optical adapter, the split sleeve is held by the pair of sleeve holders, and then the sleeve holder assembly is assembled by engaging the sleeve holders with each other.

Next, the sleeve holder assembly is fitted into an opening of the first housing. As a result, the one sleeve holder of the sleeve holder assembly is accommodated in the first housing, and the other sleeve holder of the sleeve holder assembly protrudes out of the first housing.

To optically connect the optical connectors with each other using this optical adapter, first, the optical connectors are fitted to the first housing and the second housing, respectively. At this time, a ferrule of the first optical connector is inserted into the one sleeve holder of the sleeve holder assembly mounted to the first housing.

Next, the first housing and the second housing are fitted to each other. At this time, the guides of the first housing are guided by the guide grooves of the second housing, respectively, whereby fitting the first housing and the second housing to each other is normally performed.

When the first housing and the second housing are fitted to each other, a ferrule of the second optical connector connected to the second housing is inserted into the other sleeve holder of the sleeve holder assembly, and is brought into abutment with the ferrule of the first optical connector. As a result, both of the optical connectors are optically connected.

CITATION LIST

Patent Literature

[PTL 1] JP6-184367 A.

SUMMARY OF INVENTION

Technical Problem

In the above-described optical adapter, since the sleeve holder assembly is used, there is a problem that a lot of component parts are required.

Further, to mount the sleeve holder assembly to the first housing, it is required to pass the sleeve holder assembly between the pair of guides of the first housing, so that it is not easy to perform the operation of assembling the optical adapter.

The present invention has been made in view of these circumstances, and an object thereof is to provide an optical adapter that has a reduced number of component parts, and what is more, can be easily assembled.

Solution to Problem

To solve the above-described problem, a first aspect of the preset invention can provide an optical adapter comprising a first housing to which a first optical connector is connected, a second housing to which a second optical connector is connected, and the first housing is fitted, and a sleeve that causes an end surface of an optical connection portion of the first optical connector connected to the first housing and an end surface of an optical connection portion of the second optical connector connected to the second housing to be brought into abutment with each other, wherein the first housing includes a connector holding part including a connector holding part main body for holding the first optical connector, and a first holder portion integrally formed with the connector holding part main body, for holding one end portion of the sleeve, and an alignment part including an alignment part main body which can be mounted on the connector holding part main body, a second holder portion integrally formed with the alignment part main body, for holding another end portion of the sleeve, and a plurality of protrusion-shaped guide portions integrally formed with the alignment part main body, for relatively guiding the second housing when the first housing and the second housing are fitted to each other, wherein protrusion-shaped coupling portions for coupling the connector holding part main body and the alignment part main body to each other are integrally formed on one of the connector holding part main body and the alignment part main body.

According to the optical adapter of the first aspect of the preset invention, since the first holder portion of the optical adapter is integrally formed with the connector holding part main body, it is possible to reduce the number of component parts of the optical adapter.

Further, since the protrusion-shaped coupling portions for coupling the connector holding part main body and the alignment part main body to each other are integrally formed with one of the connector holding part main body and the alignment part main body, it is possible to insert the sleeve into the holder portion of the other of the connector holding part main body and the alignment part main body without being interfered with by the protrusion-shaped coupling portions, which makes it easy to perform the operation of assembling the optical adapter.

Preferably, at least one of the plurality of guide portions is different in size.

Preferably, a spacing between the second holder portion and at least one of the plurality of guide portions is different.

Preferably, at least one of the plurality of guide portions is different in length.

The above and other objects, features and advantages of the present invention will become more apparent from the following detailed description taken in conjunction with the accompanying drawings.

Advantageous Effects of Invention

According to the present invention, it is possible to provide an optical adapter that has a reduced number of component parts and can be easily assembled.

DESCRIPTION OF EMBODIMENTS

Hereafter, an embodiment of the present invention will be described with reference to the drawings.

Figure 1:
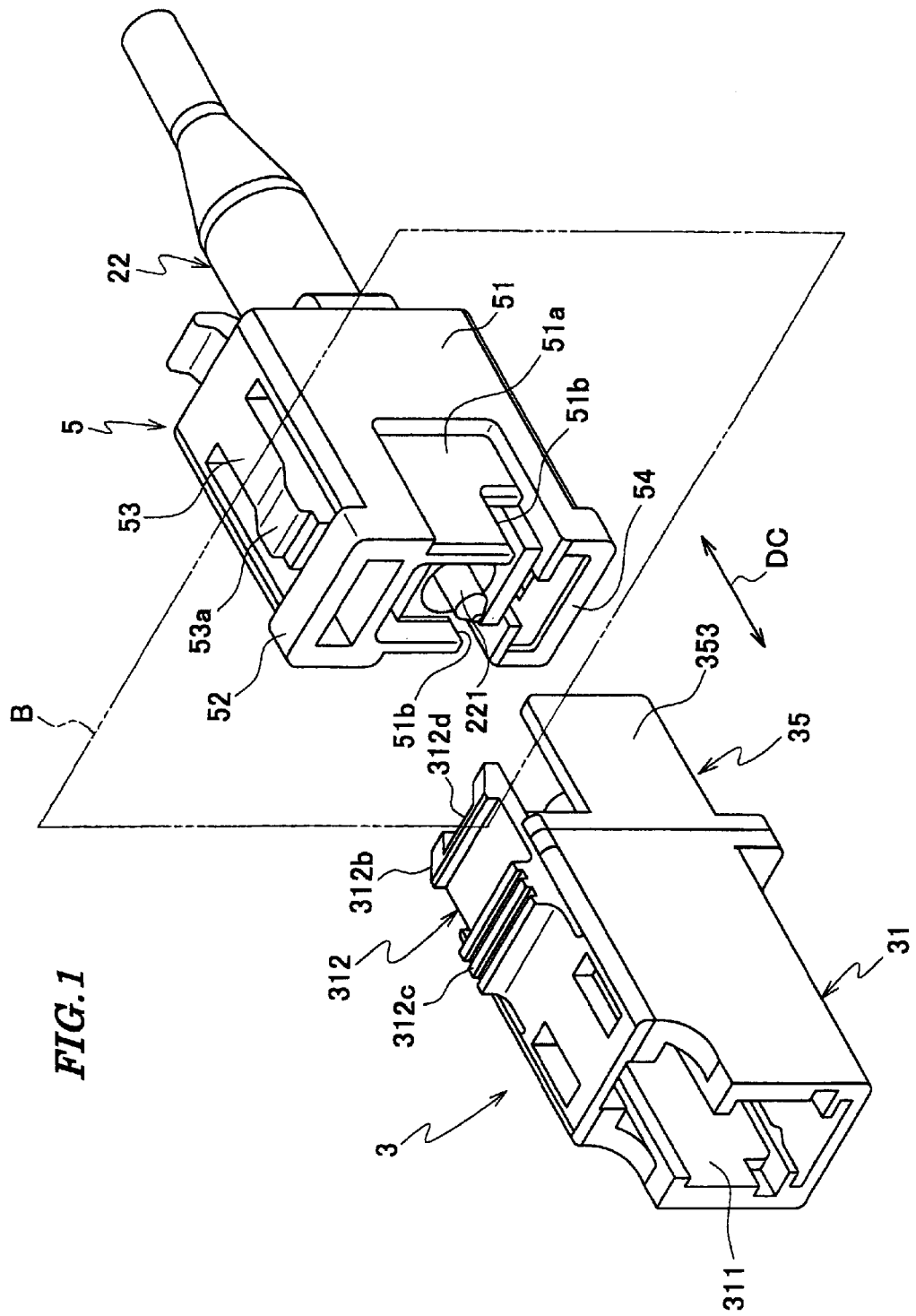
FIG. 1 is a perspective view of an optical adapter according to one embodiment of the present invention in a state in which a first housing and a second housing are separate from each other.

FIG. 1 is a perspective view of an optical adapter according to one embodiment of the present invention in a state in which a first housing and a second housing are separate from each other.

Figure 2:
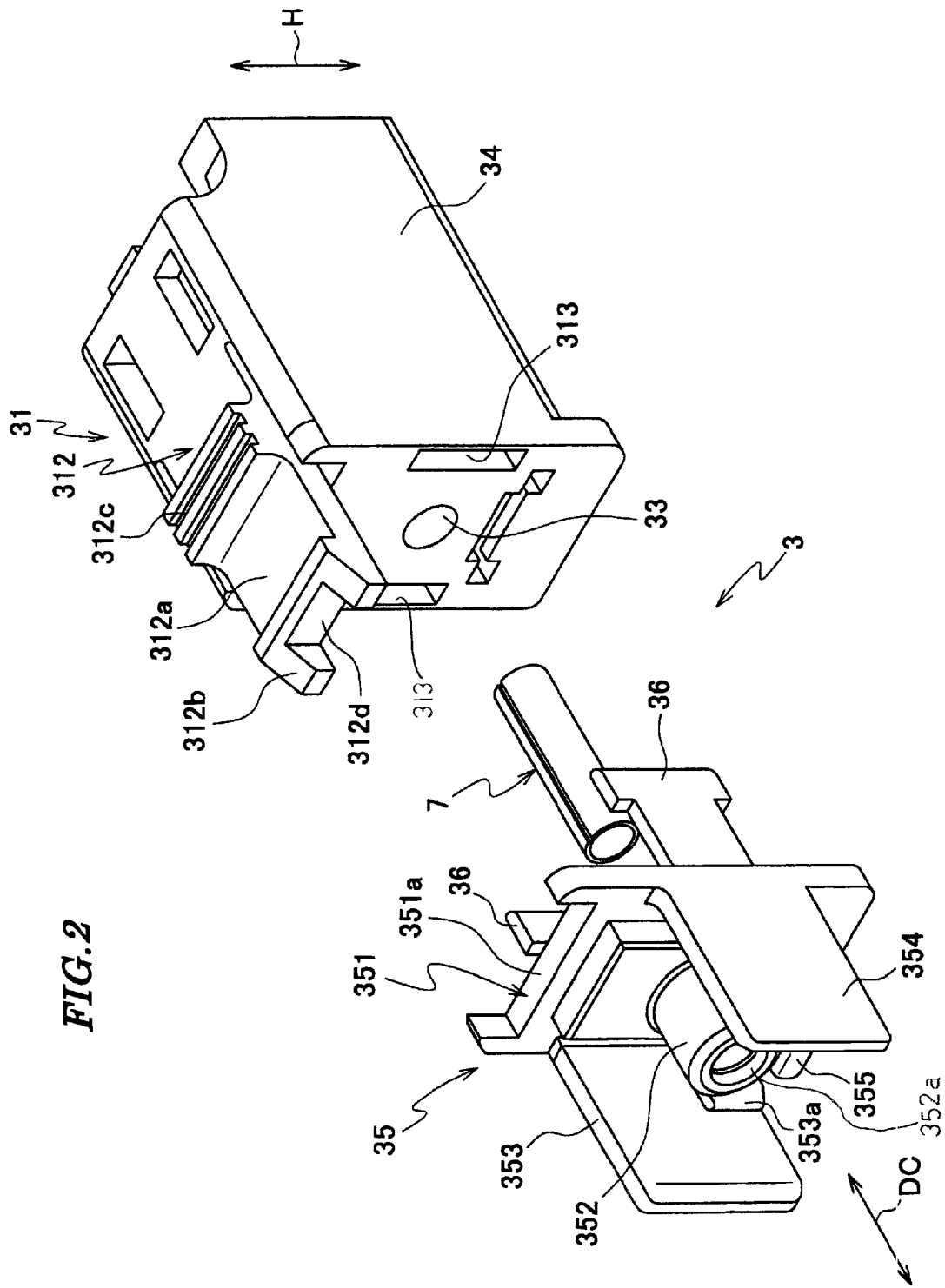
FIG. 2 is an exploded perspective view of the first housing of the optical adapter shown in FIG. 1.

As shown in FIG. 1, this optical adapter comprises a first housing 3, a second housing 5, and a split sleeve (sleeve) 7 (see FIG. 2).

A first optical connector, not shown, is connected to the first housing 3 and a second optical connector 22 is connected to the second housing 5. The first housing 3 and the second housing 5 can be fitted to each other. When the first housing 3 and the second housing 5 are fitted to each other, an end surface of a ferrule (optical connection portion), not shown, of the first optical connector and an end surface of a ferrule (optical connection portion) 221 of the second optical connector 22 are brought into abutment with each other within the split sleeve 7, whereby the first optical connector and the second optical connector are optically connected to each other.

Figure 3:
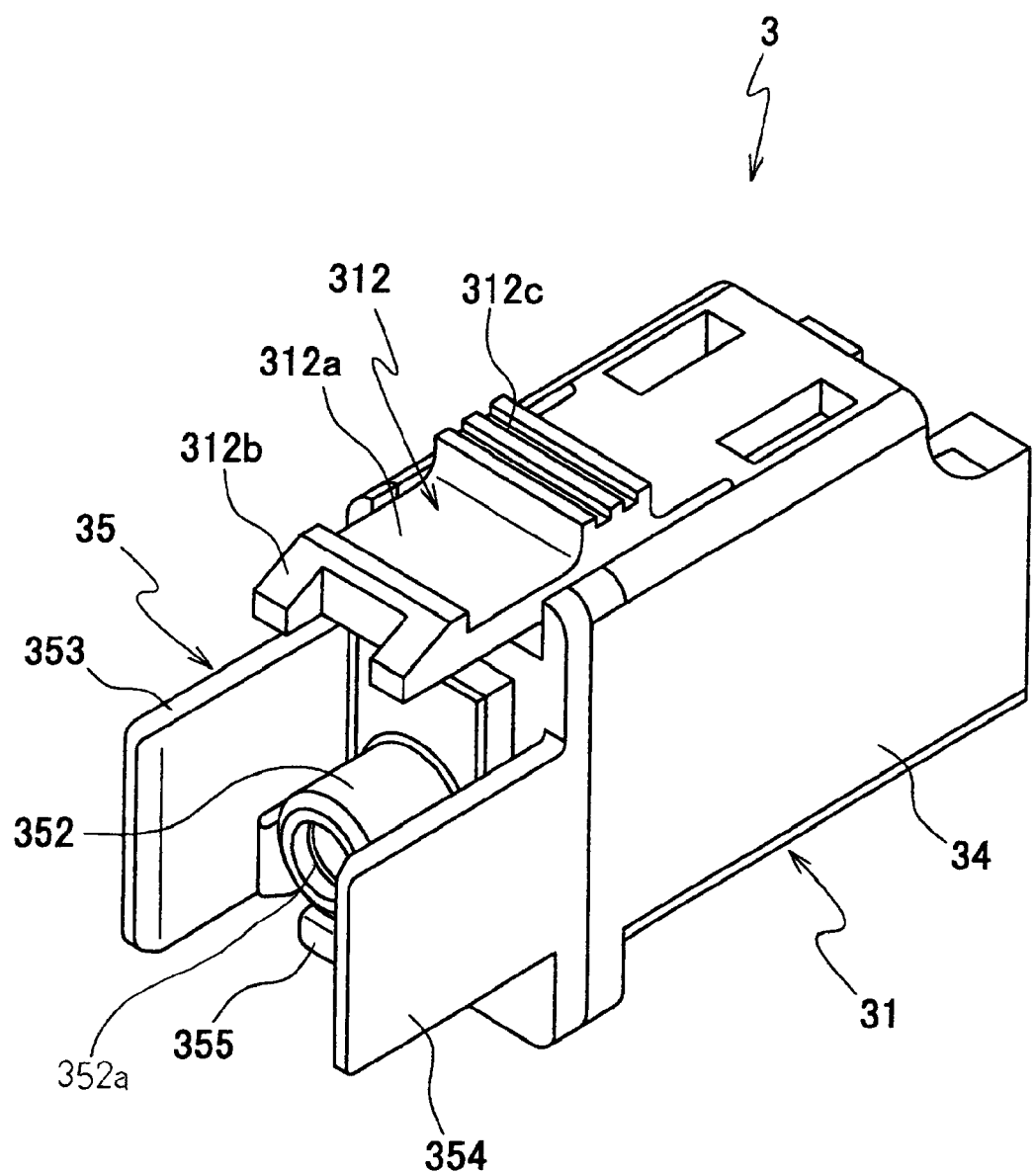
FIG. 3 is a perspective view of the first housing of the optical adapter shown in FIG. 1 in an assembled state.
Figure 4:
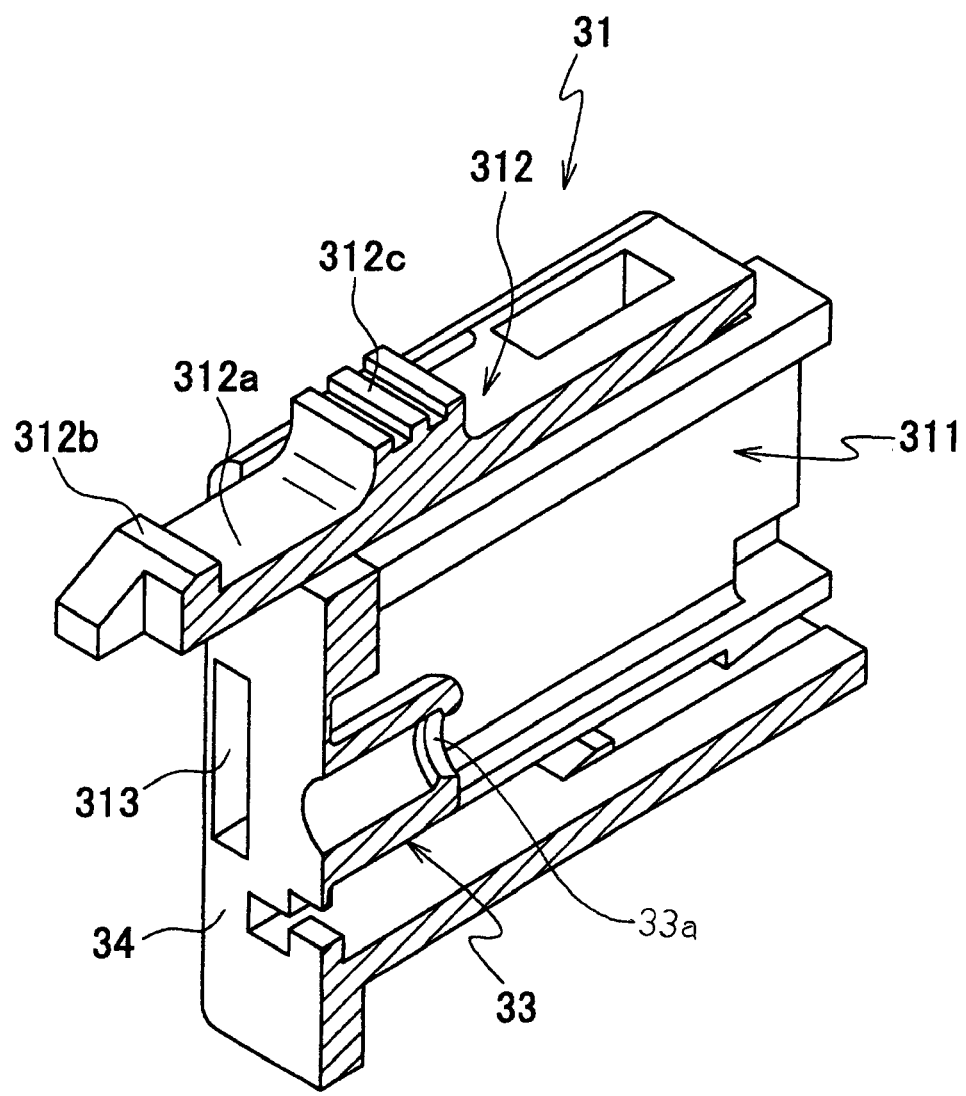
FIG. 4 is a cross-sectional view of a connector holding part of the first housing of the optical adapter shown in FIG. 1.
Figure 5:
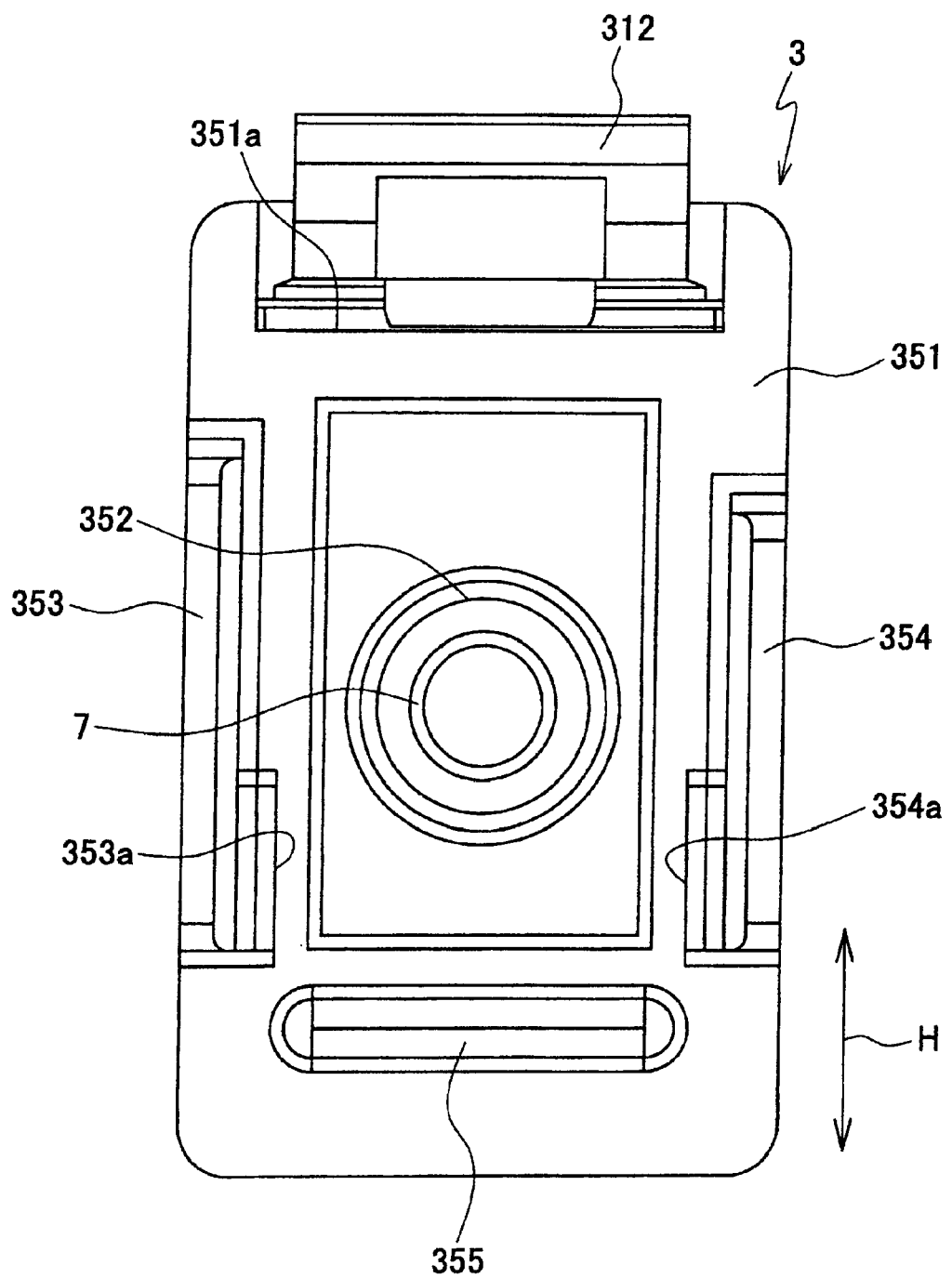
FIG. 5 is a front view of the first housing of the optical adapter shown in FIG. 1.

FIG. 2 is an exploded perspective view of the first housing of the optical adapter shown in FIG. 1. FIG. 3 is a perspective view of the first housing of the optical adapter shown in FIG. 1 in an assembled state. FIG. 4 is a cross-sectional view of a connector holding part of the first housing of the optical adapter shown in FIG. 1. FIG. 5 is a front view of the first housing of the optical adapter shown in FIG. 1.

As shown in FIGS. 2 and 3, the first housing 3 includes a connector holding part 31 and an alignment part 35.

As shown in FIGS. 2 and 4, the connector holding part 31 includes a connector holding part main body 34 and a first holder portion 33. The connector holding part main body 34 is substantially casing-shaped, and includes an accommodation space 311.

The connector holding part main body 34 has a locking portion 312 integrally formed on a top portion thereof. The locking portion 312 includes an arm portion 312a, a locking lug 312b, and an operation button 312c. The arm portion 312a is substantially long plate-shaped, and is capable of being elastically deformed in a direction of the thickness thereof. The locking lug 312b is continuous with a front end of the arm portion 312a. The locking lug 312b is formed with a cutout 312d. The locking lug 312b is engaged with a locking portion 52, referred to hereinafter.

The connector holding part main body 34 is formed with insertion holes 313 in a front surface thereof.

As shown in FIG. 4, the first holder portion 33 has a substantially hollow cylindrical shape, and is integrally formed with the connector holding part main body 34. The first holder portion 33 is disposed within the connector holding part main body 34. The first holder portion 33 receives and holds a rear portion of the split sleeve 7.

As shown in FIGS. 2 and 5, the alignment part 35 includes an alignment part main body 351, a second holder portion 352, three guide portions 353, 354, and 355, and two engaging pieces (coupling portions) 36 and 36.

The alignment part main body 351 is substantially rectangular plate-shaped. The alignment part main body 351 is formed with a cutout 351a in a top portion thereof. When the alignment part 35 is mounted to the connector holding part main body 34, the cutout 351a prevents interference between the alignment part main body 351 and the locking portion 312 of the connector holding part 31.

The second holder portion 352 has a substantially hollow cylindrical shape, and is integrally formed on a central portion of a front surface of the alignment part main body 351. The second holder portion 352 protrudes substantially perpendicular to the alignment part main body 351. The second holder portion 352 receives and holds a front portion of the split sleeve 7.

As shown in FIGS. 2 and 5, the guide portions 353 and 354 are integrally formed on opposite sides of the front surface of the alignment part main body 351, respectively. The guide portions 353 and 354 are each substantially rectangular plate-shaped, and each extend along a direction DC of fitting and removing the first housing 3 to and from the second housing 5. The guide portions 353 and 354 are parallel to each other. A short-side direction of the guide portions 353 and 354 is parallel to a direction H of a height of the connector holding part 3. The dimension of the guide portion 353 in the short-side direction is larger than that of the guide portion 354 in the short-side direction. The guide portions 353 and 354, opposed to each other, have thick portions 353a and 354a formed on lower portions of inner surfaces thereof, respectively.

The guide portion 355 is integrally formed on a lower portion of the front surface of the alignment part main body 351. The guide portion 355 has a substantially rectangular shape, and extends in the fitting/removing direction DC.

Although in the present embodiment, the guide portion 353 and the guide portion 354 are the same in length in the fitting/removing direction DC, the guide portion 353 and the guide portion 354 may be different in length.

The engaging pieces 36 and 36 are integrally formed on opposite sides of a rear surface of the alignment part main body 351, respectively. The engaging pieces 36 and 36 are each substantially T-shaped, and each extend along the fitting/removing direction DC. The engaging pieces 36 and 36 are inserted into the connector holding part main body 34 through the insertion holes 313 and 313 of the connector holding part 31, respectively, and are engaged with engaged portions, not shown, formed within the connector holding part main body 34, respectively. As a result, the alignment part 35 is coupled to the connector holding part main body 34.

As shown in FIG. 1, the second housing 5 includes a housing main body 51, the locking portion 52, a locking arm 53, and an insertion portion 54. The second housing 5 is mounted on a panel B of a casing such that a front end thereof protrudes out of the panel B.

The housing main body 51 is casing-shaped. The housing main body 51 has recesses 51a formed in opposite side walls thereof. The recesses 51a receive and hold the guide portions 353 and 354 of the first housing 3, respectively. Further, in addition to the recesses 51a, cutouts 51b are formed in the opposite side walls thereof the housing main body 51. The cutouts 51b receive the thick portions 353a and 354a of the guide portions 353 and 354 of the first housing 3.

The locking portion 52 is integrally formed on a top portion of a front portion of the housing main body 51. The locking portion 52 is substantially frame-shaped, receives a front end of the locking portion 312 of the first housing 3, and catches the locking lug 312b of the locking portion 312 by a rear surface thereof.

The locking arm 53 is integrally formed on a top portion of the housing main body 51. The locking arm 53 includes a lug portion 53a. The lug portion 53a enters the cutout 312d of the locking portion 312 of the first housing 3, which is formed as a clearance so as not to restrict bending deformation of the lug portion 53a.

The insertion portion 54 is substantially frame-shaped, and is integrally formed in a lower portion of the front portion of the housing main body 51. The guide portion 355 of the first housing 3 is inserted into the insertion portion 54.

Next, a description will be given of how the first housing 3 is assembled.

First, the rear portion of the split sleeve 7 is inserted into the first holder portion 33, and is held by the first holder portion 33 (see FIGS. 2 and 4). The front surface of the connector holding part 31 has no such a protrusion that would prevent the split sleeve 7 from being inserted into the first holder portion 33, and hence it is easy to insert the split sleeve 7 into the first holder portion 33.

Next, the engaging pieces 36 and 36 of the alignment part 35 are inserted into the insertion holes 313 and 313 of the connector holding part 31, respectively, and the front portion of the split sleeve 7 held by the connector holding part 31 is inserted into the second holder portion 352 of the alignment part 35. It should be noted that since protruding portions 33a and 352a are provided on the respective inner peripheral surfaces of the first and second holder portions 33 and 352, the split sleeve 7 is prevented from falling off.

When the entire engaging pieces 36 and 36 are inserted into the connector holding part 31, the engaging pieces 36 and 36 are engaged with the engaged portions in the connector holding part 31, and hence the alignment part 35 is connected to the connector holding part main body 34.

Thus, assembly of the first housing 3 is completed.

Next, a description will be given of the operation of connecting the first optical connector and the second optical connector 22 using this optical adapter.

As shown in FIG. 1, to connect the first optical connector and the second optical connector, the guide portions 353, 354, and 355 of the first housing 3 are inserted into the recesses 51a and 51a, and the insertion portion 54 of the second housing 5, respectively, and the locking portion 312 of the first housing 3 is inserted into the locking portion 52 of the second housing 5. At this time, the guide portions 353, 354, and 355 guide the second housing 5 relatively in the fitting/removing direction DC. Further, the locking lug 312b of the locking portion 312 of the first housing 3 is pressed down during the process of passing through the locking portion 52 of the second housing 5, whereby the arm 312a is bent, and when the locking lug 312b has passed through the locking portion 52, the locking lug 312b is returned to its original position by returning force of the arm 312a. As a result, the locking lug 312b is brought into contact with the rear surface of the locking portion 52, and the locking portion 312 of the first housing 3 is locked to the locking portion 52 of the second housing 5, whereby the first housing 3 and the second housing 5 are mechanically connected to each other.

In the split sleeve 7, the end surface of the ferrule of the first optical connector connected to the first housing 3 is brought into abutment with the end surface of the ferrule 221 of the second optical connector 22 connected to the second housing 5, whereby the first optical connector and the second optical connector 22 are optically connected to each other.

To separate the first housing 3 and the second housing 5 from the state where the first housing 3 and the second housing 5 are connected to each other, it is only necessary to push down the button 312c of the locking portion 312 of the first housing 3 to thereby release the engagement of the locking lug 312b of the locking portion 312 and the locking portion 52 of the second housing 5, and then pull the first housing 3 rearward.

According to the present embodiment, since the first holder portion 33 is integrally formed with the connector holding part main body 34, it is possible to reduce the number of component parts of the connector holding part 31.

Further, since the engaging pieces 36 and 36 are formed on the alignment part main body 351, if the split sleeve 7 is inserted into the first holder portion 33 earlier, the connector holding part 31 provides no obstacle, such as a protrusion, which would interfere with insertion of the split sleeve 7 into the first holder portion 33, and hence it is easy to perform the operation of inserting the split sleeve 7.

It should be noted that although in the present embodiment, the engaging pieces 36 and 36 are integrally formed with the alignment part main body 351 of the alignment part 35 as protrusion-shaped coupling portions, the protrusion-shaped coupling portions may be provided on the connector holding part main body 34 of the connector holding part 31. In this case, the split sleeve 7 is inserted into the second holder portion 352 of the alignment part 35 in advance, and then assembly of the optical adapter is performed.

Further, although in the present embodiment, the split sleeve 7 is employed as a sleeve, the sleeve is not limited to the split sleeve 7.

It should be noted that although in the present embodiment, the three guide portions 353, 354, and 355 are different in size and length, the number of guide portions may be two, or four or more. Further, there plurality of guide portions may be different in size and length.

It is further understood by those skilled in the art that the foregoing are the preferred embodiments of the present invention, and that various changes and modification may be made thereto without departing from the spirit and scope thereof.

REFERENCE SIGNS LIST 3 first housing
5 second housing
7 split sleeve (sleeve)
31 connector holding part
33 first holder portion
34 connector holding part main body
35 alignment part
351 alignment part main body 352 second holder portion
353, 354, 355 guide portion
36 engaging piece (coupling portion)

The invention claimed is:

1. An optical adapter comprising:
   a first housing for receiving a first optical connector which is connectable to said first housing;
   a second housing for receiving a second optical connector which is connectable to said second housing, said first housing being fitted to said second housing; and
   a sleeve that causes an end surface of an optical connection portion of the first optical connector and an end surface of an optical connection portion of the second optical connector to be brought into abutment with each other, when the first optical connector and the second optical connector are received by and connected to said first housing and said second housing, respectively,
   wherein said first housing includes:
      a connector holding part including a connector holding part main body for holding the first optical connector, and a first holder portion integrally formed with said connector holding part main body, for holding one end portion of said sleeve; and
      an alignment part including an alignment part main body which can be mounted on said connector holding part main body, a second holder portion integrally formed with said alignment part main body, for holding another end portion of said sleeve, and a plurality of protrusion-shaped guide portions integrally formed with said alignment part main body, for relatively guiding said second housing when said first housing and said second housing are fitted to each other,
      wherein protrusion-shaped coupling portions for coupling said connector holding part main body and said alignment part main body to each other are integrally formed on one of said connector holding part main body and said alignment part main body, and
      wherein at least one of the plurality of guide portions is different in size from another one of the plurality of guide portions.

2. The optical adapter as claimed in claim 1, wherein said second housing is mounted on a panel of a casing, such that a front end of said second housing, which faces said first housing, protrudes out of the panel.

3. An optical adapter comprising:
   a first housing for receiving a first optical connector which is connectable to said first housing;
   a second housing for receiving a second optical connector which is connectable to said second housing, said first housing being fitted to said second housing; and
   a sleeve that causes an end surface of an optical connection portion of the first optical connector and an end surface of an optical connection portion of the second optical connector to be brought into abutment with each other, when the first optical connector and the second optical connector are received by and connected to said first housing and said second housing, respectively,
   wherein said first housing includes:
      a connector holding part including a connector holding part main body for holding the first optical connector, and a first holder portion integrally formed with said connector holding part main body, for holding one end portion of said sleeve; and
      an alignment part including an alignment part main body which can be mounted on said connector holding part main body, a second holder portion integrally formed with said alignment part main body, for holding another end portion of said sleeve, and a plurality of protrusion-shaped guide portions integrally formed with said alignment part main body, for relatively guiding said second housing when said first housing and said second housing are fitted to each other,
      wherein protrusion-shaped coupling portions for coupling said connector holding part main body and said alignment part main body to each other are integrally formed on one of said connector holding part main body and said alignment part main body, and
      wherein a spacing between the second holder portion and at least one of the plurality of guide portions is different from a spacing between the second holder portion and another one of the plurality of guide portions.

4. The optical adapter as claimed in claim 3, wherein said second housing is mounted on a panel of a casing, such that a front end of said second housing, which faces said first housing, protrudes out of the panel.

5. An optical adapter comprising:
   a first housing for receiving a first optical connector which is connectable to said first housing;
   a second housing for receiving a second optical connector which is connectable to said second housing, said first housing being fitted to said second housing; and
   a sleeve that causes an end surface of an optical connection portion of the first optical connector and an end surface of an optical connection portion of the second optical connector to be brought into abutment with each other, when the first optical connector and the second optical connector are received by and connected to said first housing and said second housing, respectively,
   wherein said first housing includes:
      a connector holding part including a connector holding part main body for holding the first optical connector, and a first holder portion integrally formed with said connector holding part main body, for holding one end portion of said sleeve; and
      an alignment part including an alignment part main body which can be mounted on said connector holding part main body, a second holder portion integrally formed with said alignment part main body, for holding another end portion of said sleeve, and a plurality of protrusion-shaped guide portions integrally formed with said alignment part main body, for relatively guiding said second housing when said first housing and said second housing are fitted to each other,
      wherein protrusion-shaped coupling portions for coupling said connector holding part main body and said alignment part main body to each other are integrally formed on one of said connector holding part main body and said alignment part main body, and
      wherein at least one of the plurality of guide portions is different in length from another one of the plurality of guide portions.

6. The optical adapter as claimed in claim 5, wherein said second housing is mounted on a panel of a casing, such that a front end of said second housing, which faces said first housing, protrudes out of the panel.

* * * * *